Jan. 10, 1961
F. MASSA
2,967,957
ELECTROACOUSTIC TRANSDUCER
Filed Sept. 17, 1957
3 Sheets-Sheet 1
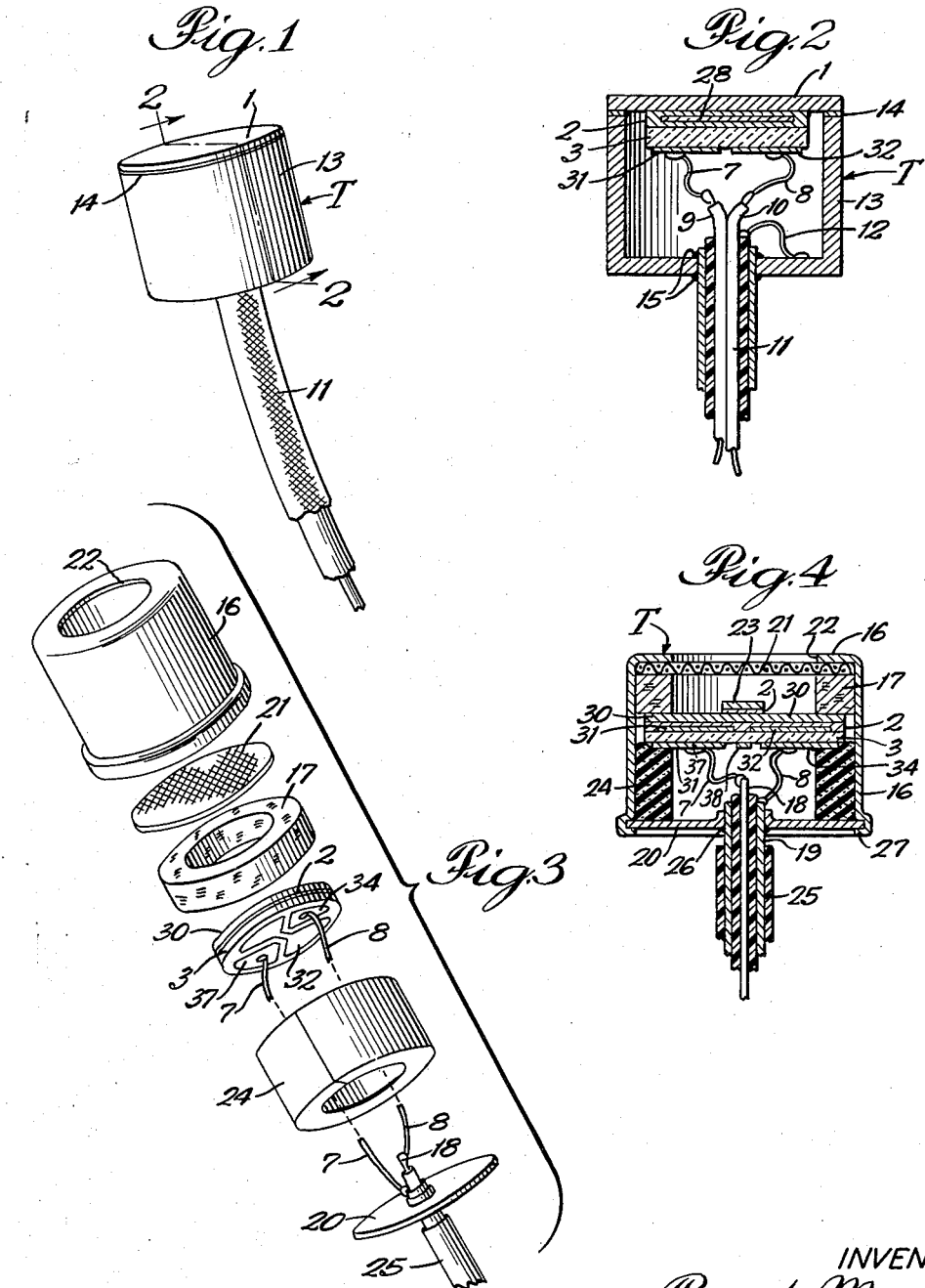
INVENTOR:
Frank Massa,
BY Louis Bernat
ATTORNEYS.

Jan. 10, 1961 F. MASSA 2,967,957
ELECTROACOUSTIC TRANSDUCER
Filed Sept. 17, 1957 3 Sheets-Sheet 2
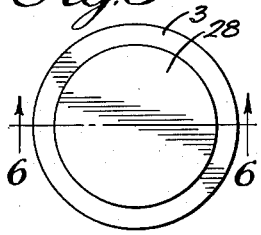
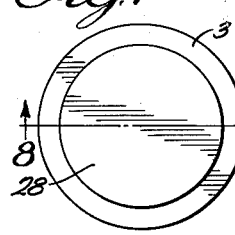
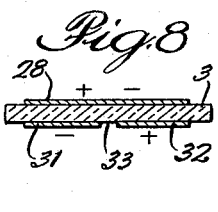
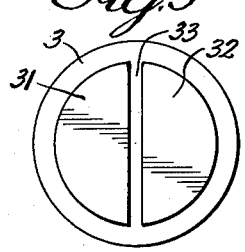
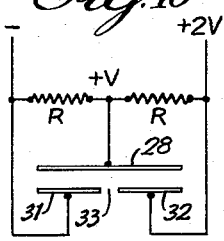
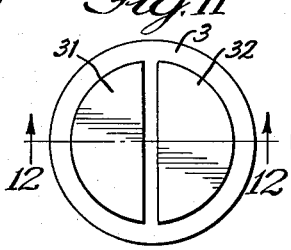
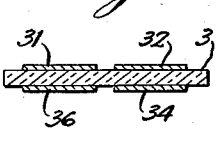
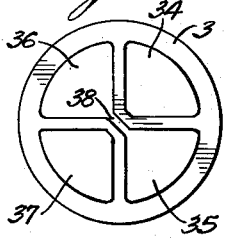
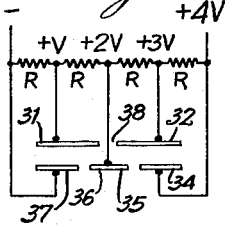
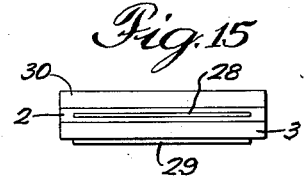
INVENTOR:
Frank Massa,
BY Louis Berns.
ATTORNEY Jan. 10, 1961  F. MASSA  2,967,957
ELECTROACOUSTIC TRANSDUCER
Filed Sept. 17, 1957  3 Sheets-Sheet 3
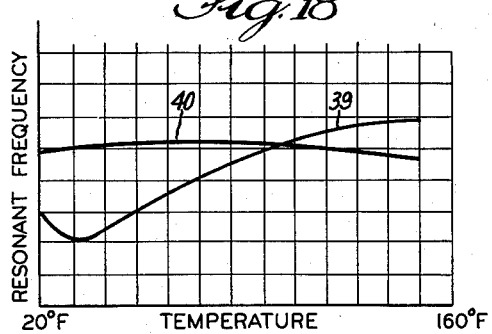
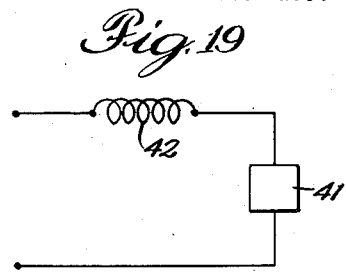
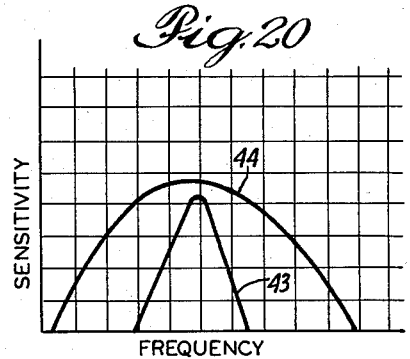
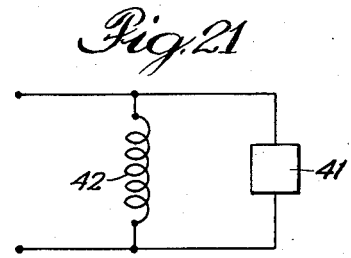
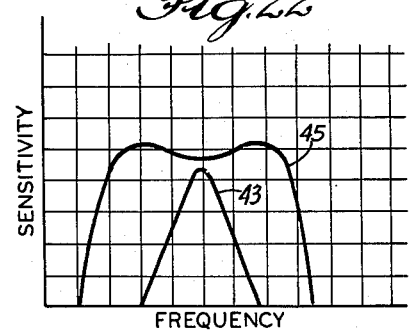
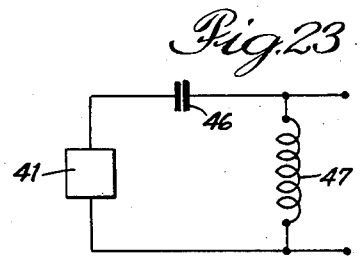
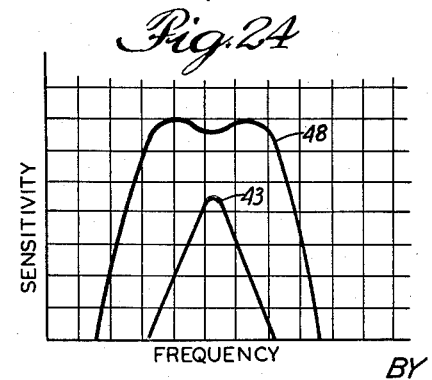
INVENTOR:
Frank Massa,
BY Louis Bernet
ATTORNEY United States Patent Office 2,967,957
Patented Jan. 10, 1961

2,967,957
ELECTROACOUSTIC TRANSDUCER
Frank Massa, 373 Atlantic Ave., Cohasset, Mass.
Filed Sept. 17, 1957, Ser. No. 684,551
11 Claims. (Cl. 310—9.4)

The invention is concerned with electroacoustic transducers and particularly with improvements in the design of a low-cost transducer adapted for operating efficiently at a predetermined frequency region. Although the new design is not limited to the high-frequency region, it is of particular economic value when used at the higher audible frequencies or in the ultra-sonic frequency region since it replaces more costly conventional systems for operating in the frequency region above approximately 10,000 cycles per second.

An object of the invention is to improve the efficiency of an electroacoustic transducer in a desired frequency band.

Another object of the invention is to provide a simple means for controlling the resonant frequency of an electroacoustic transducer.

A still further object of the invention is to design an electroacoustic transducer in which the flat cover portion of the metallic housing structure forms a portion of the vibrating electroacoustic transducer element.

Another object of the invention is to increase the voltage sensitivity of an electroacoustic transducer which converts sound pressure variations to electrical alternations by means of applying an electrode surface in electrically separated sections to at least one face of a piezoelectric element which forms part of the transducer.

A further object of the invention is to provide a simple method of shielding the out-of-phase radiation from the outer portion of a free vibrating plate operating at its first resonant mode.

Another object of the invention is to minimize the variation of resonant frequency of a transducer with change in temperature.

A still further object of the invention is to provide a low-cost method of fabricating an electroacoustic transducer.

Other objects and advantages of the invention will become evident by reading the specifications which follow. The novel features that I consider characteristics of my invention are set forth with particularity in the appended claims. The invention itself, however, both as to its organization and method of operation, as well as advantages thereof, will best be understood from the following description of several embodiments thereof when read in connection with the accompanying drawings, in which:

Fig. 1 is a perspective drawing of a transducer incorporating one form of the invention utilizing a hermetic seal type of construction.

Fig. 2 is a section taken through the line 2—2 in Fig. 1 and shows the internal construction of one form of the hermetic seal type of transducer.

Fig. 3 is an exploded isometric drawing of a transducer incorporating another embodiment of the invention.

Fig. 4 is a sectional view of the transducer as shown in Fig. 3 wherein the elements in Fig. 3 have been assembled.

Fig. 5 is a plan view of a piezoelectric crystal plate element such as X-cut quartz, L-cut ammonium dihydrogen phosphate, Y-cut lithium sulphate, polarized barium titanate, or any other plate in which the application of a voltage across the thickness of the plate will cause a change in the dimensions of the plate.

Fig. 6 is a cross-sectional view of the plate element taken along line 6—6 in Fig. 5, and illustrates the position of the electrode surfaces.

Fig. 7 is a plan view of a thin plate element of a transducer material which effectively behaves as a piezoelectric substance but is a material whose transducer properties are produced by subjecting the material to a D.-C. polarizing voltage, such as barium titanate, lead metaniobate, or any other similar transducer substance.

Fig. 8 is a cross-sectional view of the element taken along line 8—8 in Fig. 7, and shows the relative positions of the electrode surfaces with respect to both faces of the piezoelectric plate.

Fig. 9 shows a plan view of the opposite face of the transducer plate element as was shown in Fig. 7 and indicates two separated electrode portions of the transducer.

Fig. 10 shows a schematic diagram for the application of polarizing voltages to the electrode surfaces of the plate element shown in Figs. 7, 8 and 9.

Fig. 11 shows a plan view of one face of a transducer plate element indicating another type of preferred arrangement of separated electrode areas on one face of the material. The transducer material in Fig. 11 is of a polarizable type similar to the plate element indicated in Fig. 7.

Fig. 12 is a cross-sectional view of the plate element taken along the line 12—12 in Fig. 11.

Fig. 13 is a plan view of the opposite face to that shown in Fig. 11 and indicates an arrangement of separated electrode surfaces for achieving increased voltage sensitivity of the transducer.

Fig. 14 shows a schematic diagram for the application of polarizing voltages to the electrode surfaces of the element shown in Figs. 11, 12 and 13.

Fig. 15 shows a schematic assembly of an electroacoustic transducer element such as the element indicated in Fig. 5 affixed to an inert plate.

Fig. 16 schematically illustrates the bending that takes place in the assembly of Fig. 15 when a potential in a given direction is applied to the electrode surfaces of the transducer element.

Fig. 17 schematically illustrates the reverse bending that takes place in the assembly of Fig. 15 when the applied voltage is reversed in phase.

Fig. 18 is a graph illustrating the variation of resonant frequency with temperature of the transducer assembly generally illustrated in Fig. 15 and shows the improvement in temperature stability which results when the inert plate of the assembly is made from a preferred type of material.

Fig. 19 shows a schematic diagram for connecting the transducer of Fig. 1 or Fig. 3 to an electrical circuit to produce an increase in sensitivity and band width for the transducer characteristic.

Fig. 20 is a graph showing the relative change in response characteristic of the transducer when connected as illustrated in Fig. 19.

Fig. 21 shows a schematic diagram of an alternate method for connecting the transducer to an electrical circuit.

Fig. 22 is a graph illustrating the improvement in the response characteristic that results from the connection shown in Fig. 21.

Fig. 23 is a schematic diagram illustrating another type of electrical circuit connection which may be used with the transducer for increasing its sensitivity when operating as a microphone.

Fig. 24 is a graph illustrating the increased sensitivity resulting from the electrical connection illustrated in Fig. 23.

Referring more particularly to the figures in which the same reference character will be used to illustrate the same part when it appears in different figures. The reference character 1 is the radiating surface of a transducer assembly indicated generally by letter T. The radiating surface 1 is shown in the cross-section of Fig. 2. Bonded intimately to one face of the plate 1 by means of a thixotropic adhesive or cement 2 is a piezoelectric plate element 3. Although the plate element 3 may be of any one of the several types of plates that will be described in connection with Figs. 5, 7 and 11, the structure of the element 3 described in Fig. 7 is being illustrated. It shall be noted that in Fig. 1, the diameter of the plate or surface 1 is greater than the diameter of the element 3. The electrode surfaces 31 and 32, respectively, are electrically connected by means of the flexible electrical leads 7 and 8 to the two electrical conductors 9 and 10 of the cable 11 as shown. For illustrative purposes, a two-conductor shielded cable 11 and the shield 12 is electrically connected to the housing 13 as shown. This particular cable choice and electrical connection leaves both electrical terminals of the transducer assembly T free from ground and provides a totally enclosing ground shield which is desirable under certain applications where the transducer assembly T is used as a receiver of low intensity acoustic signals; and furthermore, the transducer T is used in the vicinity of electrical equipment in which interfering electrical fields may be present.

In the construction of the transducer T the plate element 1 is firmly attached to the housing 13 by means of adhesive or an organic or inorganic cement 14. This design permits the transducer assembly T to be completely waterproofed and the transducer element 3 becomes totally enclosed within a waterproof housing structure 13 comprising the vibratory surface plate 1 in combination with the housing 13. The cable 11 may be made watertight at the entrance to the housing 13 by any conventional means such as by applying a waterproof sealing compound at 15 at the joint between the cable periphery and the opening through the housing structure 13.

In the operation of the transducer assembly T shown in Figs. 1 and 2 an alternating voltage applied to the cable terminals will cause changes in dimension in the transducer plate element 3, which for the purposes of illustration, is assumed to be polarized barium titanate. The variations in dimension of the transducer plate element 3, will cause bending of the radiating surface 1 as will be more fully discussed in connection with the description of Figs. 15, 16 and 17. When the resonant frequency of the applied electrical signal coincides with the natural period of vibration of the composite sandwich plate element assembly 1 and 3, the sensitivity of the transducer will be a maximum.

If an alternating sound pressure strikes a diaphragm-type radiating surface 1 of the transducer assembly T, the oscillation of the diaphragm surface 1 will cause corresponding stresses in the transducer plate element 3 which, in turn, will generate corresponding alternating voltages across the electrodes 31 and 32 which, in turn, will appear at the terminals 7 and 8 of the cable 11. When the frequency of the alternating sound pressure corresponds with the natural resonant frequency of the composite sandwich plate assembly 1 and 3 the output voltage from the transducer assembly T will be a maximum.

In Figs. 3 and 4 the housing structure 16 is entirely separate from the transducer element 3. The transducer assembly T comprises an inert plate 30 which is bonded by means of the cement 2 to the transducer element 3 which, for purposes of illustration, is assumed to be polarized barium titanate. The electrode surfaces 37 and 34 are connected by means of flexible leads 7 and 8 to the center terminal 18 and the shield 19, respectively, of the cable 25. In this illustration, a single conductor shielded cable 25 is shown in which the shield 19 serves as one terminal and the center conductor as the other. The cable 25 passes through an opening 26 through a metallic end plate 20 and the shield 19 is preferably secured to the walls of the opening 26 by means of soldering to establish electrical connection between the shield 19 and the end plate 20. A metallic screen 21 is placed inside the housing structure 16 and covers the opening 22 which is placed through the housing structure 16 to permit the passage of sound waves. The transducer assembly plate of the transducer plate element 3 and inert plate 30, such as aluminum, nickel, copper and the related alloys of these metallic elements, will be set into free vibration when alternating voltages are supplied through the cable 25 to the electrodes 31 and 32.

When the frequency of the applied alternating voltages correspond with the natural frequency of vibration of the transducer plate assembly, the sensitivity will be a maximum. For the natural mode of vibration of a free plate, it is well known that the center portion moves out of phase with the peripheral portion of the plate surface. If the entire face of such a vibrating free plate were permitted to radiate sound into the medium, there would be a reduction in sensitivity of the structure due to the cancelling effect of the out-of-phase vibrations between the center portion of the transducer plate assembly 3 and 30 and the outer surface of the assembly 3 and 30. In order to prevent this phase interference, a resilient washer-like member 17, such as cork, has been provided, which offers negligible impedance to the free vibration of the transducer plate assembly, but effectively shields the outer surface area of the plate 30 so that only the center portion of the assembly 3 and 30 is exposed to the atmosphere through the opening 22. The natural frequency of vibration of the transducer plate assembly 3 and 30 is a function of the thickness and diameter of the assembly and also a function of the thickness of the cement joint 2.

In many applications of a transducer, it is desired that the maximum sensitivity occur at the same frequency, and it has been found possible to reduce the cost of production and maintain close limits in frequency by resorting to the use of a small weight 23 which is bonded to the plate 30 by means of the cement 2. The weight 23 is preferably in the form of a small disc which is selected such that its loading effect reduces the resonant frequency of the plate assembly 3 and 30 by the desired amount.

The preferred method of construction of the transducer of Fig. 4 to result in a low-cost structure is to make a sub-assembly of the transducer plate structure 3 and 30 with the cable and lid structure 25 and 20, respectively, providing a resilient ring 24 of a material such as foam rubber between the end plate 20 and the element 3 as shown in Fig. 4. This sub-assembly is then dropped into the opening in housing 16 and the outer edge 27 is crimped to completely finish the transducer assembly T.

The completed transducer will operate as a sound transmitter or a microphone and the optimum efficiency will occur at the natural resonance of the transducer element plate assembly 3 and 30 which is determined by the dimensions of the element 3 and plate 30, as well as by the magnitude of the weight member 23.

Figs. 5 and 6 illustrate a plan and side view of a piezoelectric crystal plate showing electrode surfaces 28 and 29, such as plated or evaporated silver, gold, copper and the like, which are in the form of continuous discs substantially covering practically the entire plane faces of the crystal element 3. The piezoelectric element 3 may be any one of the well-known cuts of piezoelectric crystals in which an applied voltage across the electrode surfaces 28 and 29 will cause a dimensional change in the dimensions of the element 3 such as, for example, L-cut ammonium dihydrogen phosphate, Y-cut lithium sulphate, or polarized barium titanate. If a piezoelectric element 3 is intimately bonded to an inert plate 30 of semi-elastic material as illustrated in Fig. 15, and if alternating voltages are applied to the electrode surfaces 28 and 29, the composite structure of Fig. 15 will bend alternately as illustrated in Figs. 16 and 17 if the polarity of the applied voltages is reversed between electrode surfaces 28 and 29. The basic reason why the composite structure bends is due to the fact that the applied voltage across the piezoelectric plate causes an alternate contraction and expansion of the element diameter. These changes in dimensions of the element 3 would cause a buckling of the assembly illustrated in Fig. 15 which effectively causes an oscillation of the assembly along the element 3 at right angles to the plane of the composite plate structure.

If a piezoelectric material is chosen whose activity results after D.-C. polarization of the substance such as the class of substances which include barium titanate and lead metaniobate, it is possible to increase the voltage sensitivity of the transducer structure when used as a microphone by applying electrode surfaces in disconnected areas over the surface of the element 3 and by polarizing the material in a prescribed manner with reference to the disconnected electrodes. Figs. 7, 8 and 9 illustrate one method that has been found advantageous for effecting an increase in the voltage sensitivity of a transducer assembly T when used as a microphone. A barium titanate element 3 is covered with an electrode surface 28 on one of its faces as shown in Fig. 7. On the opposite face of the plate two symmetrical areas of electrodes 31 and 32 are applied, as shown in Fig. 9, leaving a margin 33 along one diameter of the element 3 as shown. If this element 3 is polarized by applying a D.-C. potential of magnitude of about 2V, where V is an arbitrary magnitude of voltage, between electrodes 31 and 32 as illustrated in the circuit diagram of Fig. 10, and if the center tap voltage +V is applied to the electrode 28, then each half of the crystal element 3 will be polarized in opposite polarity as illustrated schematically by the plus and minus markings in Fig. 8. With this type of polarization, the voltage generated across the electrodes 31 and 32, when the element 3 is assembled into a composite assembly such as illustrated in Fig. 15, will be twice the value that would be realized for the configuration of the elements indicated in Figs. 5 and 6.

In Figs. 11, 12 and 13, another embodiment is shown illustrating a multiple of subdivision of electrode surfaces in which four quadrant sections are effectively separately polarized as illustrated in the schematic wiring diagram of Fig. 14. On one face of the element 3 are two separated electrodes 31 and 32 as shown in Fig. 11. This configuration is equivalent to the configuration illustrated in Fig. 9. The opposite face of element 3 contains four symmetrical electrode areas 34, 35, 36 and 37. A pair of electrodes 36 and 35 are electrically connected by the conducting strip 38 as shown. Fig. 14 schematically shows the application of the D.-C. polarizing voltage across the electrode surfaces 34, 35, 36 and 37. If the electroded surface illustrated in Figs. 11 and 13 is substituted for the electroded surface shown in Figs. 7 and 9 and the same composite plate assembly is made as illustrated in Fig. 15, then a higher voltage will be generated as the composite transducer assembly is bent because of the fact that four incremental voltages will be effectively in series for the electrode connection of Figs. 11 and 13 as compared to the two incremental voltages which will appear in series for the arrangement of Figs. 7 and 9.

In the conventional method of electrodes in which a single potential exists between the entire surface of the element 3 such as illustrated in Figs. 5 and 6, only one increment of voltage will appear across the electrodes during the bending of the composite assembly. Therefore, it can be seen that in the case of a polarizable material, such as barium titanate, it is possible to subdivide the electrodes and to effectively break up the transducer plate into multiple pairs of elements and to polarize these pairs of elements in such fashion that the alternating voltages generated in each of the separate areas of the element 3 will be effectively connected in series to result in increased output voltage when the structure is employed as a microphone.

In making the transducer plate assembly 3 and 30, plate 30 may be any inert elastic material and it may be either metallic or non-metallic. For transducer assemblies that are to operate in the frequency region above 10,000 cycles per second, it has been found that the use of an aluminum plate as the inert member of the sandwich assembly gave satisfactory results. It has been also found that if the thickness of the aluminum plate 30 is made equal to or greater than the thickness of the barium titanate element 3, the entire thickness of the barium titanate will be in tension when it is on the convex side of the bent assembly, as illustrated in Fig. 16, and in compression when it appears on the concave side as illustrated in Fig. 17. If the thickness of the aluminum plate 30 is less than the thickness of the barium titanate element 3, a portion of the barium titanate element 3 nearest the center of the composite assembly will be of opposite stress to the outer portion of the element when the assembly is deformed and under this condition the voltage generated in that inner portion of the plate would be of opposite phase to the voltage generated in the outer portion of the barium titanate element 3, thus causing a reduction in sensitivity.

By using an aluminum plate in combination with a barium titanate element 3, it has been found possible to minimize the variation of resonant frequency of the assembly with temperature. Curve 39 in Fig. 18 shows the relative change in resonant frequency with temperature of a composite assembly of a barium titanate element bonded to an unpolarized plate of barium titanate. Curve 40 shows the relatively negligible variation in resonant frequency with changes in temperature for the composite assembly of a barium titanate element bonded to an aluminum plate.

Fig. 19 illustrates a circuit arrangement for operating the transducer of Fig. 1 or Fig. 3 as a loud speaker and to achieve an increase in sensitivity over a wider frequency band of operation. The structure 41 represents the transducer. An inductance 42 is connected in series with the transducer 41 and the magnitude of the inductance is selected so that its reactance is equal to the reactance of the transducer 41 at its resonant frequency of operation. The tuning effect of the series inductance will change the response curve 43 of the individual transducer to the response curve 44 as shown in Fig. 20.

Fig. 21 shows an alternate tuning arrangement in which the inductance 42 is connected in parallel with the transducer 41. If the reactance of the inductance 42 is made equal to the reactance of the transducer 41 at the resonant frequency of the transducer, response curve 45 results from the tuned circuit as compared to the original response curve 43 for the transducer alone. The circuit connection of Fig. 21 results in a higher electrical impedance at resonance than the connection of Fig. 19. Therefore, the voltage output from the transducer 41 when used as a microphone with the circuit connection indicated in Fig. 21 will be increased as illustrated by curve 45 in Fig. 22.

In Fig. 23 is shown another circuit arrangement in which condenser 46 is placed in series with the transducer 41 and an inductance 47 shunts the combined series elements as illustrated. This circuit connection has the effect of stepping up the impedance higher than results from the simple shunt circuit shown in Fig. 21, and as a result, the output of the transducer 41 when used as a microphone may be increased appreciably as illustrated by curve 48 in Fig. 24 as compared to the sensitivity curve 43 of the transducer operating by itself.

It shall be noted that the transducer herein described has numerous applications as a microphone, receiver or transmitting structure. In particular, the transducer may be an element used in a remote sensing device, such as a television frequency selector. The transducer is initially activated by a continuous signal or pulse generated by striking a resonant reed or tuning fork. The remote signal is then converted into an electrical signal by the transducer which initiates a stepping relay or solenoid which operates a frequency band selector switch.

Another application of the transducer-receiver is to incorporate the device with a multiple geared stepping relay having variable contact elements in order to develop a sequential program system. This system in turn would establish a combination sequence which has been adapted for remote door opening devices and the like. Another modification is to use two or more transducers having different frequency bands, thereby materially increasing the number of combinations.

The ultrasonic frequency range is generally considered in the frequency region in excess of 10,000 cycles per second. The upper frequency range may exceed a quarter of a million cycles per second although one hundred thousand cycles per second affords a practical range. In the instant invention, I have found a preferred range of twenty to twenty-seven thousand cycles per second; although the range may be extended or lowered depending on the particular application.

My invention has been described in connection with several embodiments which have been chosen to illustrate the basic ideas; however, it will be obvious to those skilled in the art that numerout deviations will be possible from the specific details shown, and therefore, the invention shall not be limited except insofar as is made necessary by the prior art and by the spirit of the appended claims.

What is claimed is:

1. In an electroacoustic transducer the combination of a housing structure, a circular opening through one wall of said housing structure, a resilient washer-like member arranged to surround said opening, a circular unitary transducer assembly comprising a composite circular disc consisting of two bonded circular plates, the first plate comprising a material element having the property of being made piezoelectric by the application of a direct current polarizing potential, said element when piezoelectric in response to such a direct current polarizing potential having transverse dimensions which are subject to change under the influence of an applied alternating current, conductor means for applying said direct current polarizing potential to said first plate, and the second plate comprising a metallic material whose transverse dimensions are not subject to dimensional changes under the influence of an applied alternating electric current, said second plate comprising sectionalized electrode means adapted to be connected to a source of direct current polarizing potential and being of opposite polarities during the polarization of such element, said unitary transducer assembly being arranged such that an annular portion of one surface area of said disc makes contact with said resilient washer-like member and the center section of said disc lies opposite the circular opening placed in said housing.

2. Claim 1 characterized in that said first plate is a piezoelectric barium titanate material.

3. Claim 1 characterized in that a compensating disc substantially smaller in diameter than the diameter of the composite circular disc is attached to the center portion of one side of said composite disc whereby the resonant frequency of said composite disc is lowered.

4. In an electroacoustic transducer adapted for converting sound vibrations to electrical alternations which includes an element having the property of being made piezoelectric by the application of a direct current polarizing potential, a plate, bonding means for securely attaching said element to said plate, said element having electrode surfaces attached to the faces of said element, said element characterized in that sound pressure vibrations falling on said element assembly causes alternating voltages to be generated across said electrode surfaces, means for increasing the generated voltage in said element assembly, said means including sectionalized electrode surfaces over at least one face of said piezoelectric element, said sectionalized electrode surfaces being of opposite polarities during the polarization of said piezoelectric element, and electrical conducting means for electrically connecting the generated voltages of opposite polarities such that they are additive.

5. In an electroacoustic transducer employing a structure as in claim 4 characterized in that said element is made from polarized barium titanate and further characterized in that the polarization across the barium titanate element is of opposite electrical polarity at different sections of said element.

6. In a composite transducer device for converting electrical energy to vibrational energy, the combination of two isotropic plates, at least one of which has the property of being made piezoelectric by the application of a direct current polarizing potential, said one plate when piezoelectric in response to such a direct current polarizing potential having transverse dimensions which are subject to change under the influence of an alternating electric current, means for bonding said two plates into a unitary composite assembly having a total thickness dimension at least equal to the sum of the thickness dimensions of said plates, sectionalized electrode means connected to the piezoelectric plate and means for applying a direct current polarizing potential to said electrode means to place the latter at opposite polarities during polarization of said piezoelectric plate and for applying alternating electric current to said electrode means of the polarized piezoelectric plate whereby the transverse dimensional changes in the polarized piezoelectric plate caused by said alternating current produces right-angle vibrations of said composite transducer assembly.

7. The combination of an electroacoustic transducer device comprising a housing structure having an opening therein, a pair of plates, at least one of which comprises a transducer element integrally bonded to the other plate, said transducer element having the property of being made piezoelectric by the application of a direct current polarizing potential, said transducer element when piezoelectric in response to such a direct current polarizing potential having transverse dimensions which are subject to variation under the influence of a varying electric current, means for securing said other plate to seal the opening in said housing structure, said polarized transducer element being positioned wholly within the enclosure formed by said housing structure and said other plate, sectionalized electrode means connected to the transducer element and being of opposite polarities during the polarization of the transducer element and electrical conductor means for establishing electrical connections between said sectionalized electrode means at the polarized transducer element and the exterior of said housing structure.

8. An electroacoustic transducer device comprising the combination of a housing structure, a circular opening through one wall of said housing, a resilient spacer member positioned adjacent to said opening, a circular unitary transducer assembly comprising a composite circular disc consisting of two bonded circular plates, at least one of said plates comprising a polarizable element having the property of being made piezoelectric by the application of a direct current polarizing potential, said element when piezoelectric in response to a direct current polarizing potential having transverse dimensions which are subject to change under the influence of an applied alternating current, sectionalized electrode surfaces on said element, said sectionalized electrode surfaces being of opposite polarities during the polarization of said element, and electrical conductor means connected to said sectionalized electrode surfaces for applying the direct current polarizing potential thereto, said unitary transducer assembly being arranged such that an annular portion of the surface area of one of said plates makes contact with said resilient spacer member and the center section of said plate lies opposite the circular openings formed in said housing structure.

9. An electroacoustic transducer device in accordance with claim 8 further comprising a compensating disc assembly smaller in diameter than the diameter of the composite circular disc, said compensating disc being attached to the center portion of one side of said composite circular disc to lower the resonant frequency of said composite circular disc.

10 An electroacoustic transducer device comprising the combination of a housing structure, an opening formed through one wall of said housing structure, a composite assembly having an outer surface adapted to radiate acoustic energy and comprising at least two bonded plates, one of said plates comprising a polarizable element having the property of being made piezoelectric by the application of a direct current polarizing potential, said element having transverse dimensions which are subject to change under the influence of an applied alternating current, sectionalized electrode means connected to said element for applying the direct current polarizing potential thereto, said sectionalized electrode means being of opposite polarities during the polarization of said element, and mechanical means for supporting said composite assembly within said housing structure such that its outer surface lies opposite said opening formed in said housing structure, said mechanical means supporting said composite assembly within said housing such that the peripheral edge of said composite assembly is substantially mechanically unrestrained during the vibration of said composite assembly.

11. An electroacoustic transducer device in accordance with claim 10 further comprising an acoustic shield positioned in the proximity of a portion of said outer surface of said composite assembly to attenuate the vibrations from the shielded area of the composite assembly for preventing such attenuated vibrations from being transmitted to the medium surrounding said electroacoustic transducer device.

References Cited in the file of this patent

UNITED STATES PATENTS

| | | |
|---|---|---|
| 2,105,010 | Sawyer | Jan. 11, 1938 |
| 2,242,756 | Pope | May 20, 1941 |
| 2,248,870 | Langevin | July 9, 1941 |
| 2,430,013 | Hansell | Nov. 4, 1947 |
| 2,433,383 | Mason | Dec. 30, 1947 |
| 2,472,179 | Tibbetts | June 7, 1949 |
| 2,472,714 | Massa | June 7, 1949 |
| 2,607,858 | Mason | Aug. 19, 1952 |
| 2,614,144 | Howatt | Oct. 14, 1952 |
| 2,769,867 | Crownover | Nov. 6, 1956 |
| 2,795,648 | Mason | June 11, 1957 |
| 2,880,497 | Hall | Apr. 7, 1959 |
| 2,894,317 | Marks | July 14, 1959 |